(12) United States Patent
Tanaka

(10) Patent No.: US 7,314,213 B2
(45) Date of Patent: Jan. 1, 2008

(54) FLUID-FILLED VIBRATION DAMPING DEVICE

(75) Inventor: Eiji Tanaka, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 84 days.

(21) Appl. No.: 11/211,559

(22) Filed: Aug. 26, 2005

(65) Prior Publication Data

US 2006/0043657 A1     Mar. 2, 2006

(30) Foreign Application Priority Data

Aug. 27, 2004   (JP) ............................. 2004-249178

(51) Int. Cl.
*F16F 5/00* (2006.01)
(52) U.S. Cl. .................................... 267/140.5
(58) Field of Classification Search ............. 267/140.5, 267/140.11, 140.13, 140.3
See application file for complete search history.

(56) References Cited

U.S. PATENT DOCUMENTS

| | | | | |
|---|---|---|---|---|
| 4,458,888 A | * | 7/1984 | Wolf et al. ............. | 267/140.12 |
| 4,955,589 A | * | 9/1990 | West ..................... | 267/140.12 |
| 5,263,815 A | * | 11/1993 | Brenner ................. | 267/219 |
| 5,386,973 A | * | 2/1995 | Brenner et al. ......... | 267/140.13 |
| 5,531,426 A | * | 7/1996 | Bruhl .................... | 267/140.12 |
| 6,443,438 B2 | | 9/2002 | Satori et al. | |
| 6,663,090 B2 | | 12/2003 | Simuttis et al. | |
| 2002/0000688 A1 | | 1/2002 | Simuttis et al. | |
| 2002/0158389 A1 | * | 10/2002 | Yoshida et al. ......... | 267/140.11 |

FOREIGN PATENT DOCUMENTS

| | | |
|---|---|---|
| JP | 04-043636 Y2 | 10/1992 |
| JP | 05-240293 A | 9/1993 |
| JP | 07-127684 A | 5/1995 |
| JP | 10-331901 A | 12/1998 |

\* cited by examiner

*Primary Examiner*—Xuan Lan Nguyen
(74) *Attorney, Agent, or Firm*—Oliff & Berridge, PLC

(57) ABSTRACT

A fluid-filled vibration damping device including: a rubber elastic body interposed between and elastically connecting an inner shaft and an outer cylinder; a pair of fluid chambers having an non-compressible fluid sealed therein and formed facing on both sides, in the inner shaft axis-perpendicular direction; an orifice passage through which the pair of fluid chambers communicate with each other; a through hole formed through the inner shaft in the axis-perpendicular direction; and a movable rubber layer fluid-tightly closing the through hole and being exposed at opposite major surfaces thereof to the pair of fluid chambers, respectively so that pressure in the respective fluid chambers are exerted against the major surfaces of the movable rubber layer.

9 Claims, 9 Drawing Sheets

FLUID-FILLED VIBRATION DAMPING DEVICE

INCORPORATED BY REFERENCE

The disclosure of Japanese Patent Application No. 2004-249178 filed on Aug. 27, 2004 including the specification, drawings and abstract is incorporated herein by reference in its entirety.

BACKGROUND OF THE INVENTION

1. Field of the Invention

The present invention relates to a fluid-filled vibration damping device in which damping effects are obtained based on the flowing action of a fluid sealed in the interior, and in particular relates to a fluid-filled vibration damping device which is suitable for use as automobile engine mounts or body mounts, differential mounts, and suspension bushes.

2. Description of the Related Art

JP-U-4-43636 discloses one type of known damping device used as a damping connector or damping support mounted between members forming a vibration transmission system. The disclosed damping device includes an inner shaft and outer cylinder disposed radially apart from each other, which are connected by a rubber elastic body, and is capable of exhibiting damping effects, based on the flowing action of a non-compressible fluid, against vibrations input in an axis-perpendicular direction. In this type of damping device, a pair of fluid chambers connected by an orifice passage are generally located facing on both sides, in the axis-perpendicular direction, of the inner shaft, so as to obtain damping effects based on the resonance action of the fluid flowing through the orifice passage when vibrations are input in the axis-perpendicular direction.

The damping effects of damping devices are sometimes needed for vibrations with several or a wide range of frequencies. For example, automobile damping devices are required to have excellent damping performance against vibrations with several or a wide range of frequencies, from the low frequency range to the high frequency range, because the input vibrations that need to be absorbed will vary depending on the vehicle traveling state.

However, a problem with the fluid-filled vibration damping device structured in the above manner is the narrow range of frequencies in which it is possible to effectively bring about damping effects on the basis of the resonance action of the fluid flowing through the orifice passage. It is thus difficult to obtain sufficient damping effects against vibrations with several or a wide range of frequencies, and difficult to realize the necessary damping properties. A major problem in particular is the dramatic loss of damping performance upon the development of extremely high dynamic spring associated with increased flow resistance in the orifice passage when the input vibrations are of a higher frequency range than the frequency range for which the orifice passage has been tuned.

To address this problem, as described in JP-A-10-331901, for example, it has been proposed that an actuator should be incorporated to control the switchover between a plurality of fluid passages, so as to deliberately switch between damping effects according to the input vibrations. However, problems with this damping device are that the incorporation of the actuator results in an extremely complex structure which is difficult to manufacture, as well as in higher costs and larger sizes.

In another proposal, as described in JP-A-7-127684, for example, a barrier wall component formed by a rubber elastic body, dividing a pair of fluid chambers formed on both sides of an inner shaft, is made in the form of a readily deformable thin-walled component, and pressure fluctuations prompted in one fluid chamber during the input of vibrations in the high frequency range escape into the other fluid chamber due to the elastic deformation of the thin-walled component, thereby preventing the development of extremely high dynamic spring.

However, because the thin-walled component is formed by the rubber elastic body itself elastically connecting the inner shaft and outer cylinder in this damping device, providing the thin-walled component runs the risk of adversely affecting the spring properties of the damping device. Furthermore, because the thin-walled component is formed by the rubber elastic body itself elastically connecting the inner shaft and outer cylinder, input vibrations directly cause elastic deformation of the thin-walled component. It is thus difficult to make the thin-walled component thin enough when attempting to realize the spring properties required of the damping device and ensure the durability of the thin-walled component. It is therefore sometimes difficult to effectively obtain low dynamic spring effects based on pressure fluctuation absorbing action with this type of thin-walled component.

SUMMARY OF THE INVENTION

It is therefore one object of the invention to provide a fluid-filled vibration damping device having a simple structure, which is capable of exhibiting effective damping performance against vibrations input in the axis-perpendicular direction on the basis of resonance action of an non-compressible fluid in the tuned frequency range of an orifice passage, and avoiding development of extremely high dynamic spring in the high frequency range over the tuned frequency range to obtain good damping effects, while minimizing adverse effects on the durability and basic damping properties achieved by the rubber elastic body, a fluid-filled vibration damping device having a novel structure.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a fluid-filled vibration damping device comprising: an inner shaft with a solid structure; an outer cylinder disposed a certain distance apart in an axis-perpendicular direction from the inner shaft; a rubber elastic body interposed between and elastically connecting the inner shaft and the outer cylinder; a pair of fluid chambers in which an non-compressible fluid is sealed are formed facing on both sides, in the axis-perpendicular direction, of the inner shaft; an orifice passage through which the pair of fluid chambers communicate with each other; a through hole formed through the inner shaft in the axis-perpendicular direction; and a movable rubber layer fluid-tightly closing the through hole and being exposed at opposite major surfaces thereof to the pair of fluid chambers, respectively so that pressure in the respective fluid chambers are exerted against the major surfaces of the movable rubber layer.

In a fluid-filled vibration damping device having a structure according to this mode, damping effects are brought about on vibrations input in the axis-perpendicular direction on the basis of resonance action of the fluid flowing through the orifice passage in the frequency range for which the orifice passage has been tuned. Furthermore, relative pressure fluctuations, which are produced between the pair of fluid chambers during the input of vibrations in the high frequency range over the tuned frequency range of the orifice passage, are exerted on one of the sides of the movable rubber layer, allowing the pressure fluctuations produced in one fluid chamber to escape into the other fluid chamber based on the elastic deformation of the movable rubber layer.

Pressure fluctuations in the fluid chambers are thus attenuated, preventing the development of extremely high dynamic spring associated with substantial blockage of the orifice passage, as well as dramatic decreases in damping performance caused by it. It is thus possible to obtain good damping performance, not only in the tuned frequency range of the orifice passage, but in a broad range of frequencies as far as the high frequency range over the tuned range.

In addition, there is no increase in the overall size of the fluid-filled vibration damping device according to this mode because the conventional dead space in the interior of the inner shaft can be efficiently exploited by disposing the movable rubber layer there.

The movable rubber layer, which is disposed with the periphery being supported by the inner shaft, can be formed as a member that is substantially separate in terms of stress from the rubber elastic body. It is thus possible to minimize the adverse effects on durability and basic spring properties which occur in damping devices in which the movable rubber layer is formed by the rubber elastic body.

A second mode of the invention provides a fluid-filled vibration damping device according to the first mode, characterized in that the orifice passage is formed along the inner circumferential surface of the outer cylinder. A fluid-filled vibration damping device with a structure according to this mode can ensure that the orifice passage has a beneficial length, so as to ensure a more beneficial degree of freedom in terms of the damping effects based on the resonance action of the fluid flowing through the orifice passage, or in terms of tuning the range of frequencies in which such effects can be brought about.

A third mode of the invention provides a fluid-filled vibration damping device according to the first or second mode, further comprising a fluid passage formed in at least one of the pair of fluid chambers, extending from the one of the fluid chamber toward the movable rubber layer. A fluid filled vibration damping device having this structure makes it possible to bring about low dynamic spring effects based on the resonance action of the fluid flowing through the fluid passage. The length and cross sectional area of the fluid passage can also be suitably modified to tune the frequency range in which low dynamic spring effects can be brought about based on the resonance action of the fluid flowing through the fluid passage.

A fourth mode of the invention provides a fluid-filled vibration damping device according any of the first through third modes, characterized in that the movable rubber layer is integrally formed with the rubber elastic body. The movable rubber layer can be readily formed in a fluid-filled vibration damping device having this structure.

A fifth mode of the invention provides a fluid-filled vibration damping device according to any of the first through fourth modes, further comprising wherein a pair of pockets having openings open in an outer circumferential surface of the rubber elastic body and being located on both sides in a diametric direction of the inner shaft, the openings of the pair of pockets being fluid-tightly covered by the outer cylinder so as to form the pair of fluid chambers, and wherein the outer cylinder includes a window opening provided in a portion covering one of the pair of fluid chambers, and the window opening is fluid-tightly closed by a movable rubber layer so that the one fluid chamber is partially formed by the movable rubber layer, thereby forming, by means of the pair of fluid chambers, a pressure receiving chamber partially formed by the rubber elastic body so that pressure fluctuations are directly produced in conjunction with the elastic deformation of the rubber elastic body when vibrations are input in the axis-perpendicular direction between the inner shaft and the outer cylinder, and an equilibrium chamber partially formed by the movable rubber layer so that changes in volume are readily accommodated through the deformation of the movable rubber layer.

In the fluid-filled vibration damping device formed according to this mode, part of the wall of the equilibrium chamber is formed by the movable rubber layer, so that the wall spring rigidity of the equilibrium chamber can be adjusted, for example, by modifying the movable rubber layer size, thickness, slack, structural material, and the like to adjust the spring properties of the movable rubber layer.

The wall spring rigidity of the equilibrium chamber can thus be adjusted with a considerable degree of freedom without adjusting the spring properties of the rubber elastic body which has such a significant influence on the support spring rigidity and the like in the fluid-filled vibration damping device. It is thus possible to ensure a greater degree of freedom in tuning the orifice passage, that is, the degree of freedom relating to the damping effects based on the resonance action of the fluid flowing through the orifice passage and to tuning the range of frequencies in which such effects can be brought about, while ensuring sufficient support spring rigidity in the fluid-filled vibration damping device.

Furthermore, in the fluid-filled vibration damping device formed according to this mode, changes in volume are readily accommodated through the deformation of the movable rubber layer in the equilibrium chamber joined to the pressure receiving chamber through the orifice passage, so that it is possible to control the peaky properties of the damping effects brought about on the basis of the resonance action of the fluid flowing through the orifice passage. The damping effects based on the resonance action of the fluid flowing through the orifice passage can thus be brought about over a greater range of frequencies.

Still furthermore, in the fluid-filled vibration damping device formed according to this mode, the pressure receiving chamber and equilibrium chamber are positioned facing radially one way on both sides of the inner shaft, thus ensuring greater rubber volume in the rubber elastic body in the direction perpendicular to the direction in which the pressure receiving chamber and equilibrium chamber are facing. It is thus possible to establish a greater spring ratio in the direction in which the pressure receiving chamber and equilibrium chamber are facing and the direction perpendicular thereto.

In the fluid-filled vibration damping device formed according to this mode, it is possible to obtain damping effects, based on the resonance action of the fluid flowing through the orifice passage, in the direction in which the pressure receiving chamber and equilibrium chamber are facing, while it is also possible to obtain effective high dynamic spring properties with the rubber elastic body in the radial direction perpendicular to the direction in which the pressure receiving chamber and equilibrium chamber are facing.

A sixth mode of the invention provides a fluid-filled vibration damping device according to any of the first through fifth modes, characterized in that the inner shaft has a solid structure inserted through one axial opening of the outer cylinder toward the axial intermediate portion so that the one axial opening of the outer cylinder is fluid-tightly closed by the rubber elastic body that elastically links the inner shaft and the outer cylinder, while an other axial opening of the outer cylinder is fluid-tightly closed by a flexible film, and an axis-perpendicularly expanding partition member is disposed by being supported by the outer cylinder between axial facing surfaces of the rubber elastic body and the flexible film, so that a primary fluid chamber partially formed by the rubber elastic body and an auxiliary fluid chamber partially formed by the flexible film are formed on either side of the partition member, sealing an non-compressible fluid in the primary and auxiliary fluid chambers, and a communicating passage through which the primary and auxiliary fluid chambers communicate with each other is formed.

In the fluid-filled vibration damping device formed according to this mode, damping effects based on the resonance action of the fluid flowing through the fluid passage linking the primary and auxiliary fluid chambers together can be obtained when axial vibrations are input.

Effective damping performance can thus be brought about for axial vibrations as well as vibrations in the axis-perpendicular direction.

A seventh mode of the invention provides a fluid-filled vibration damping device according to the sixth mode, characterized in that both the movable rubber layer and the flexible film are bonded by vulcanization to the outer cylinder so that the window opening of the outer cylinder is fluid-tightly closed by the movable rubber layer, and the other opening of the outer cylinder is fluid-tightly closed by the flexible film. In the fluid-filled vibration damping device according to this mode, the movable rubber layer and the flexible film can be collectively handled, simplifying the manufacturing process during the manufacture of the fluid-filled vibration damping device and reducing the number of handled parts.

An eighth mode of the invention provides a fluid-filled vibration damping device according to the seventh mode, characterized in that the movable rubber layer and the flexible film are integrally formed of the same rubber material, and a seal rubber layer covering the inner circumferential surface of the outer cylinder over generally the entire surface is integrally formed with the movable rubber layer and the flexible film, and is bonded by vulcanization to the outer cylinder.

A ninth mode of the invention provides a fluid-filled vibration damping device according to any of the sixth through seventh modes, further comprising: an attachment bracket having a cylindrical portion that is fitted and secured to the outer cylinder so that the movable rubber layer disposed at the window opening of the outer cylinder is covered from the outside by the cylindrical portion of the attachment bracket so as to form a sealed air chamber on a side opposite the equilibrium chamber with the movable rubber layer interposed therebetween. In the fluid-filled vibration damping device with a structure according to this mode, the spring properties of the movable rubber layer can be adjusted by utilizing the compressive elasticity of the air sealed in the air chamber formed on the opposite side from the equilibrium chamber on both sides of the movable rubber layer. The damping effects based on the resonance action of the fluid flowing through the orifice passage and the range of frequencies in which such effects can be brought about may therefore be tuned with an ever greater degree of freedom.

A tenth mode of the invention provides a fluid-filled vibration damping device according to any of the first through fifth modes, characterized in that the inner shaft is in the form of a solid structure extending axially through the outer cylinder, the facing surfaces of the inner shaft and outer cylinder in the axis-perpendicular direction being connected by the rubber elastic body along substantially the entire length in the axial direction.

As will be apparent from the preceding description, the sealed fluid type of damping apparatus constructed according to the invention affords effective damping performance against vibrations input in the axis-perpendicular direction in the tuned frequency range of the orifice passage, based on the resonance action of the fluid flowing through the orifice passage, and pressure fluctuations in the fluid chambers are attenuated, based on the elastic deformation of the movable rubber layer, with respect to vibrations in put in the axis-perpendicular direction in the high frequency range over the tuned frequency range of the orifice passage. Thus, it is possible to prevent dramatic decreases in damping performance caused by the development of extremely high dynamic spring associated with substantial blockage of the orifice passage. It is thus possible to obtain effective damping effects in the tuned frequency range of the orifice passage as well as a broad range of frequencies in the high frequency range over the tuned range.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
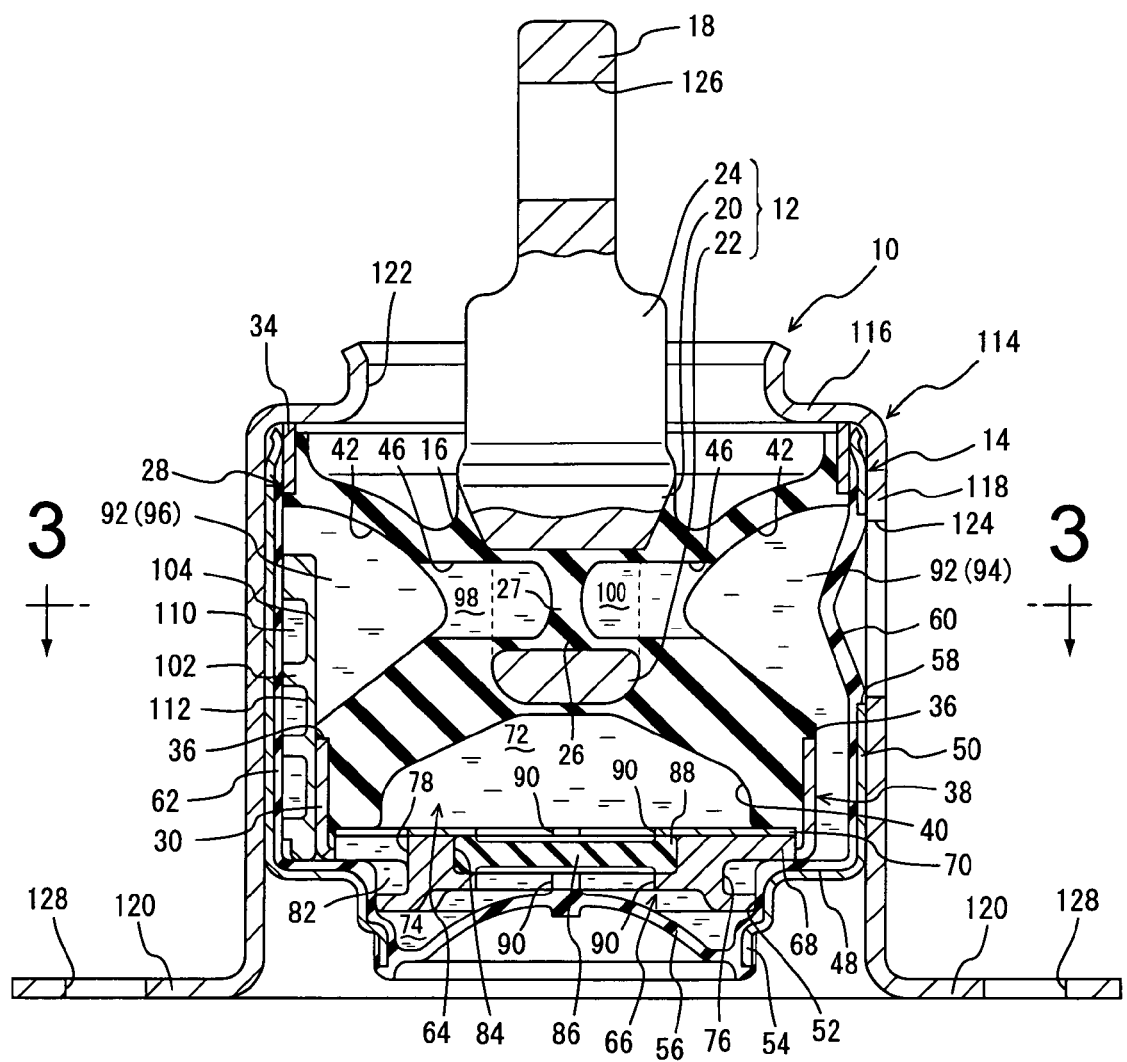
FIG. 1 is an elevational view in axial or vertical cross section of a fluid-filled vibration damping device in the form of an engine mount for use in an automotive vehicle of construction according to a first embodiment of the invention, taken along line 1-1 of FIG. 3.
Figure 2:
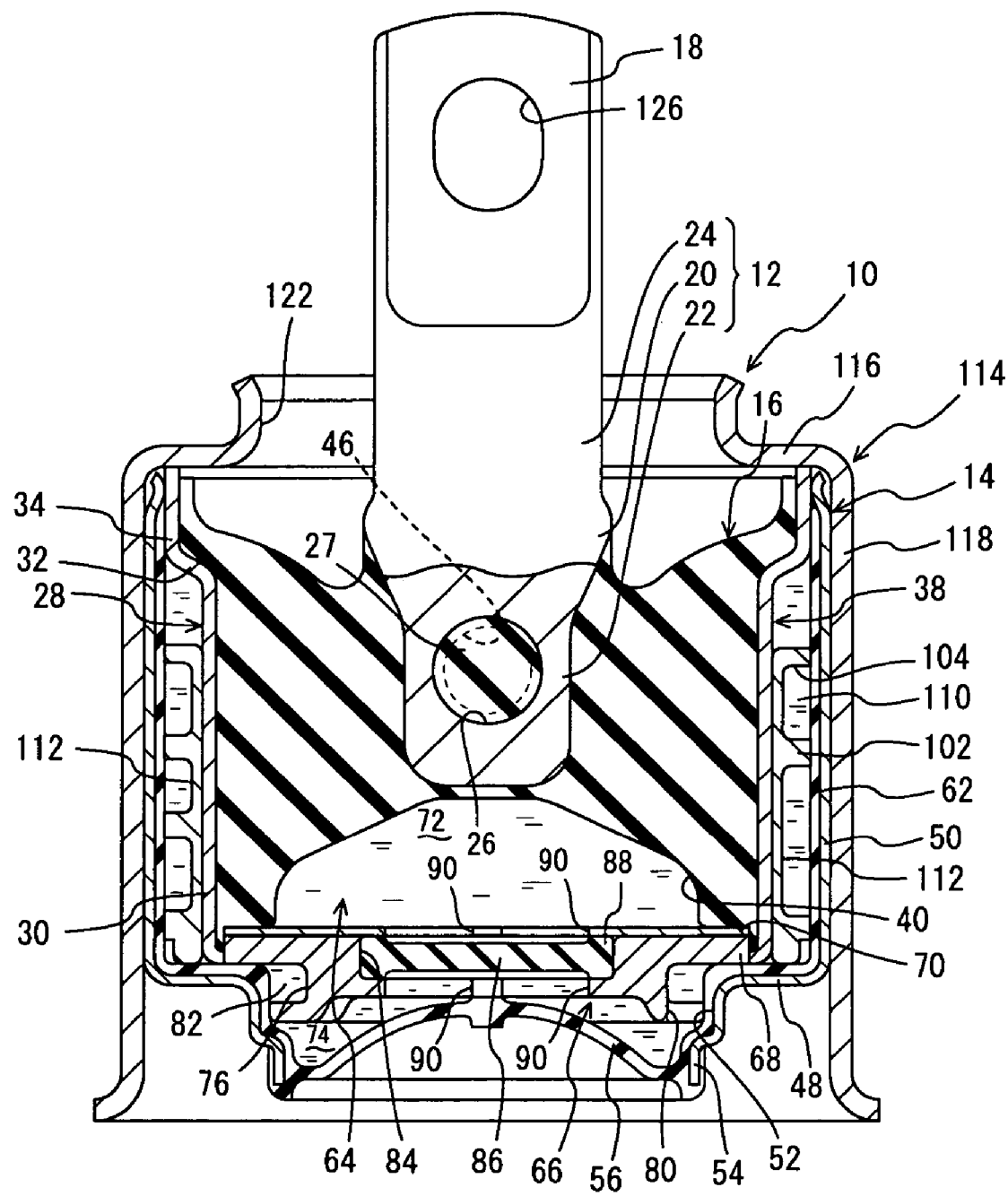
FIG. 2 is a cross sectional view taken along line 2-2 of FIG. 3.
Figure 3:
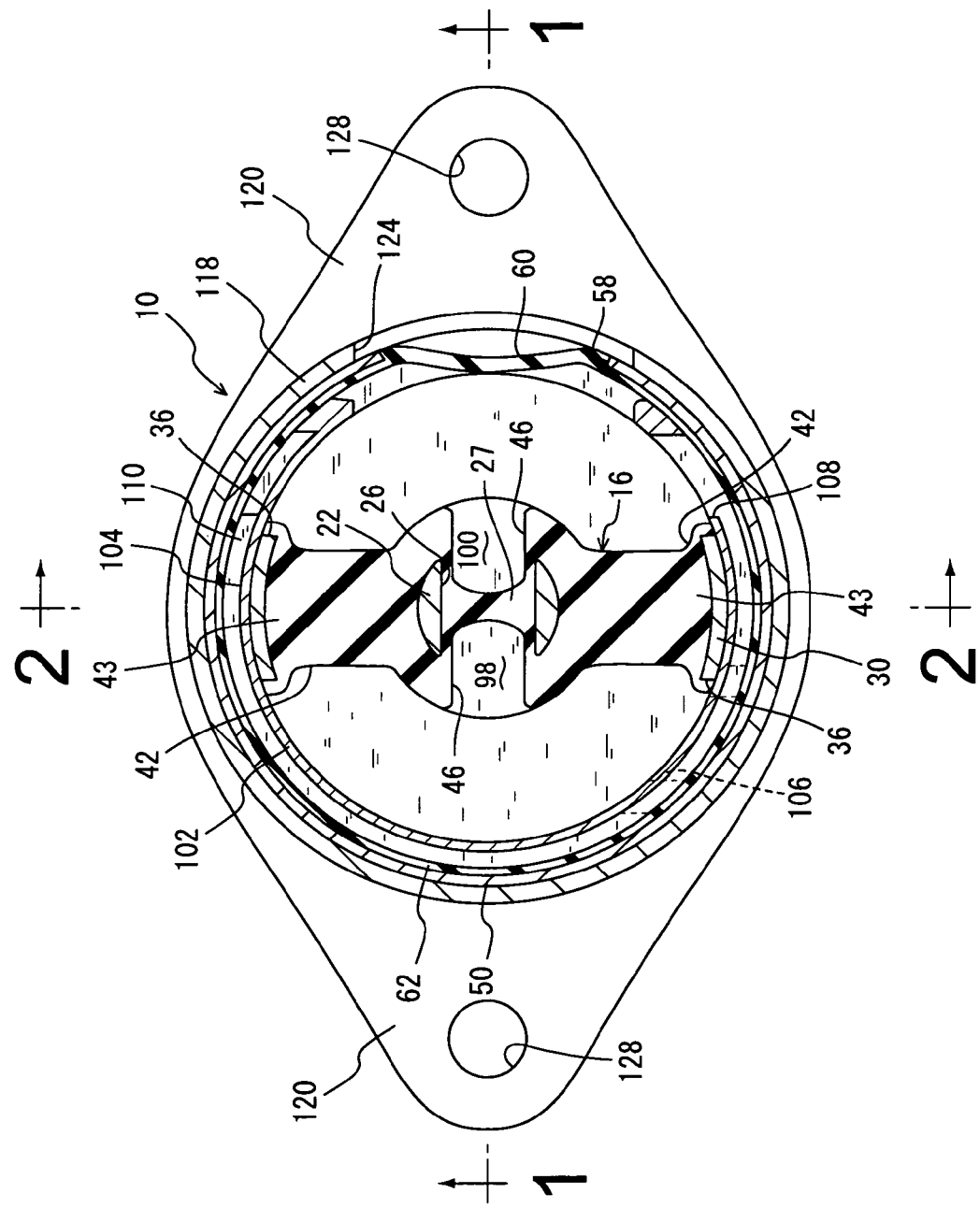
FIG. 3 is a cross sectional view taken along line 3-3 of FIG. 1.
Figure 4:
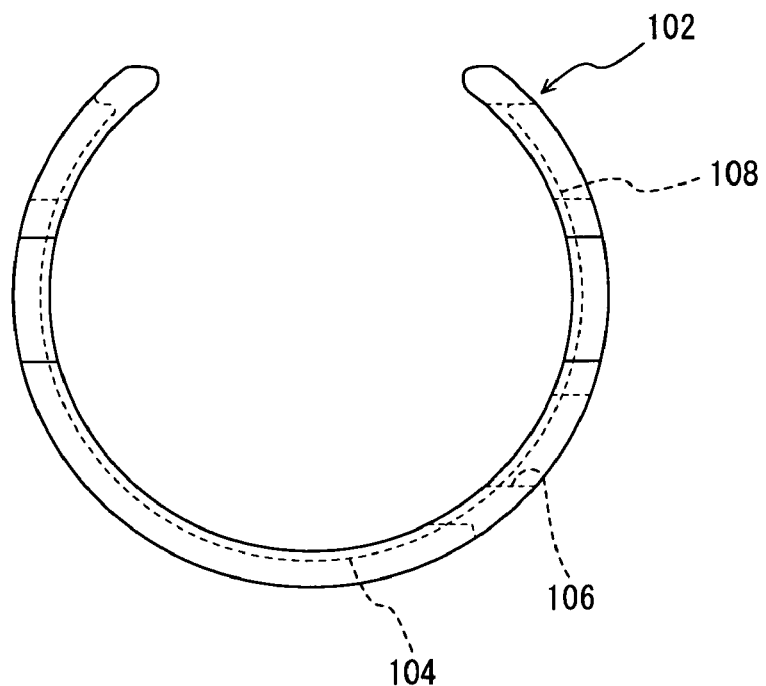
FIG. 4 is a plane view of a cylindrical orifice member of the engine mount of FIG. 1.
Figure 5:
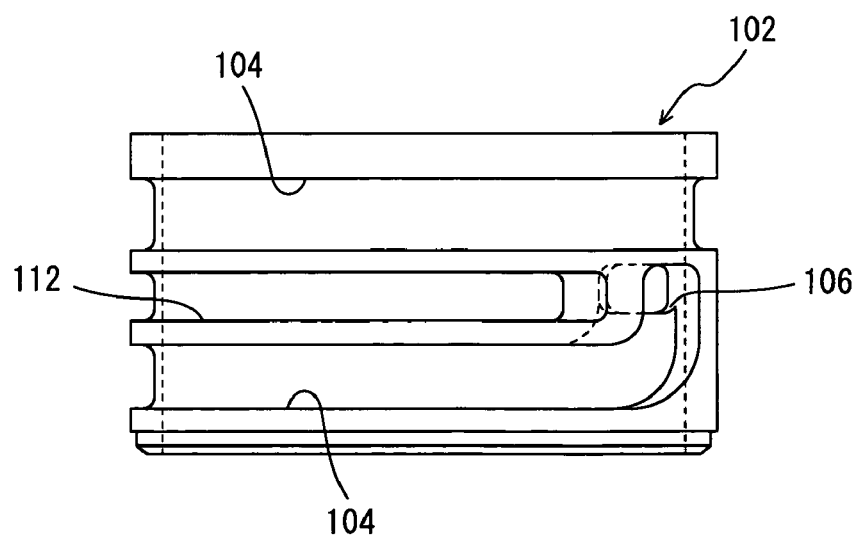
FIG. 5 is a front elevational view of the cylindrical orifice member of FIG. 4.
Figure 6:
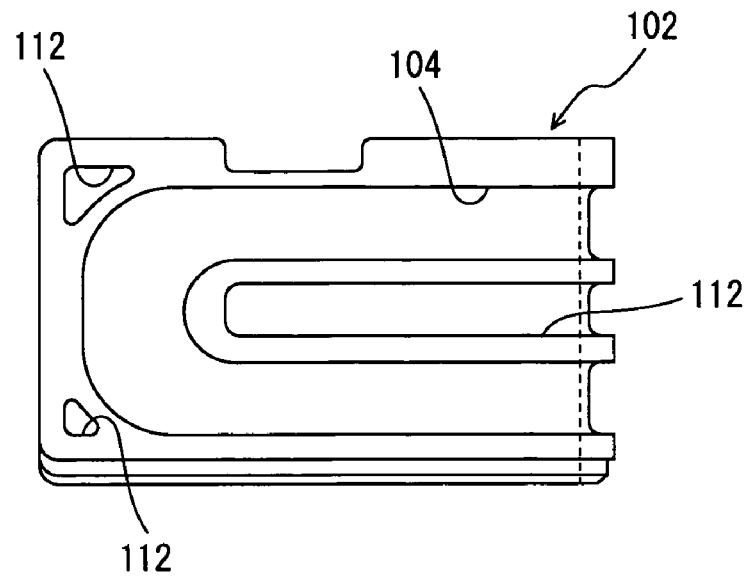
FIG. 6 is a left-side elevational view of the cylindrical orifice member of FIG. 4.
Figure 7:
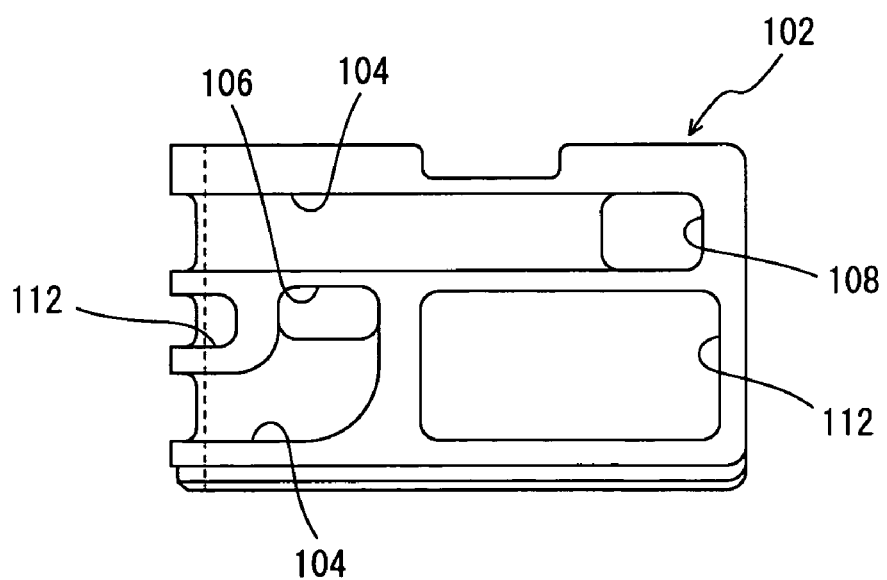
FIG. 7 is a right-side elevational view of the cylindrical orifice member of FIG. 4.

FIGS. 1-3 illustrate an engine mount 10 for use in an automotive vehicle of construction according to a first embodiment of the invention. This engine mount 10 has a construction wherein a metallic inner shaft member 12 serving as the inner shaft and a metallic outer cylindrical member 14 serving as the outer cylinder are disposed apart, the inner shaft member 12 and outer cylindrical member 14 being elastically linked by means of a rubber elastic body 16, with the inner shaft member 12 attached to the automobile power unit and the outer cylindrical member 14 attached to the automobile body, so that the power unit is supported in a vibration-damped manner relative to the body. The engine mount 10 in this embodiment is mounted with the vertical direction in FIG. 1 being in a generally perpendicular vertical direction. As a rule, in the following description, the vertical direction refers to the vertical direction in FIG. 1.

More specifically, the inner shaft member 12 is in the shape of a solid rod of small diameter, an attachment fixing portion 18 being integrally formed with the axial upper end extending vertically straight. A stepped tapered portion 20 is provided in the axial intermediate portion of the inner shaft member 12, with the axial bottom side in the form of a small diameter portion 22 on one side of the stepped tapered portion 20, and the axial upper side in the form of a large diameter portion 24 on the other side of the tapered portion.

In the inner shaft member 12, a through hole 26 is formed passing in the axis-perpendicular direction through an axial bottom side portion thereof. More specifically, the through hole 26 is formed so as to pass in the axis-perpendicular direction through the upper end portion of the small diameter portion 22 in a generally constant round cross section.

A movable rubber layer 27 is disposed in the through hole 26 formed in the inner shaft member 12, and the outer peripheral edge of the movable rubber layer 27 is bonded by vulcanization to the inner circumferential surface of the through hole 26. The through hole 26 is thus fluid-tightly closed by the movable rubber layer 27. In this embodiment, the movable rubber layer 27 is disposed in generally the center portion in the direction in which the through hole 26 extends, so that the through hole 26 is fluid-tightly closed by the movable rubber layer 27 in the generally center portion in the direction in which the hole extends.

On the outer circumferential side of the inner shaft member 12, a thin-walled, cylindrical metal sleeve 28 of large diameter is disposed generally coaxially on the center axis at a certain distance in the radial direction. The metal sleeve 28 has a stepped cylindrical configuration, in which a large diameter cylindrical portion 34 is integrally provided, via a radially outward-expanding stepped portion 32, with the one axial end (axial upper end) of a straight small diameter cylindrical portion 30 axially extending straight along generally the entire length. A pair of windows 36, 36 are formed in the axially facing portion in the axial intermediate portion of the metal sleeve 28. In this embodiment, each window 36 is open in the circumferential direction for a length less than half the circumference.

The inner shaft member 12 and metal sleeve 28 having this structure are disposed so that the inner shaft member 12 is inserted through the upper axial opening of the metal sleeve 28. When the inner shaft member 12 is disposed in this way relative to the metal sleeve 28, the metal sleeve 28 is disposed at a distance in the radial direction around the entire small diameter portion 22 in the inner shaft member 12. With the inner shaft member 12 thus disposed relative to the metal sleeve 28 in this way, the attachment fixing portion 18 of the inner shaft member 12 is positioned protruding upward in the axial direction of the metal sleeve 28, while the axial bottom end of the small diameter portion 22 is positioned midway in the axial direction not as far as the axial bottom end of the metal sleeve 28.

The rubber elastic body 16, is disposed between the radially facing planes of the metal sleeve 28 and the inner shaft member 12 in the above positional relationship, and the inner shaft member 12 and the metal sleeve 28 are elastically linked by the rubber elastic body 16. The rubber elastic body 16 is in the form of a round block overall, where the stepped tapered portion 20 and the small diameter portion 22 of the inner shaft member 12 are seated so as to extend from the center of the upper surface along the center axis. The outer peripheral surface of the stepped tapered portion 20 and the small diameter portion 22 are bonded by vulcanization to the rubber elastic body 16. The metal sleeve 28 is also superposed on and bonded by vulcanization to the outer circumferential surface of the rubber elastic body 16. That is, in this embodiment, the rubber elastic body 16 is formed as an integrally vulcanized molded article 38 comprising the inner shaft member 12 and the metal sleeve 28.

A round, downward opening recess 40 in the form of an inverted mortar of large diameter is formed in the center of the axial bottom end face of the rubber elastic body 16. A pair of pockets 42, 42 open at the outer circumferential surface are formed on both sides, in the radial direction, of the inner shaft member 12 in the axial intermediate portion. The pair of pockets 42, 42 are formed to a length less than half the circumference in the circumferential direction, having an expanding open shape in which the width of the opening in the axial direction gradually increases as it approaches the open end, and are open at the outer circumferential surface through the pair of windows 36, 36 formed in the metal sleeve 28. As noted above, the pair of pockets 42, 42 are formed to a length less than half the circumference in the circumferential direction, so that a pair of connectors 43, 43 elastically link the inner shaft member 12 and metal sleeve 28 in a direction perpendicular to the direction in which the pair of pockets 42, 42 are facing. Both of the pair of pockets 42, 42 are also formed deviating a certain amount axially upward from the axial center of the rubber elastic body 16, so that the axial bottom wall is thicker overall than the axial upper wall in the pockets 42.

Opening holes 46 open at the wall surface of the pockets 42 are also formed in the rubber elastic body 16. The opening holes 46 are formed so as to extend straight, by means of a generally fixed cross section (round cross section in this embodiment), in the direction in which the through hole 26 extends, that is, the radial direction of the rubber elastic body 16, using the movable rubber layer 27 as a common floor wall. That is, in this embodiment, the two opening holes 46, 46 are formed so as to extend straight in the outward radial direction, with a generally constant cross section, on both sides, in the radial direction, of the movable rubber layer 27. In this embodiment, the rubber elastic body 16 extends as far as the inner circumferential surface of the through hole 26, and the rubber elastic body 16 is integrally formed with the movable rubber layer 27 in the portion extending as far a the inner circumferential surface of the through hole 26. Thus, in this embodiment, by means of a round cross section that is smaller around than the through hole 26, the opening holes 46 are formed so as to extend straight in the direction in which the through hole 26 extends. Also in this embodiment, the opening holes 46 are formed with generally the same dimension in the direction of extension (direction of depth), cross sectional shape, and cross sectional size.

The outer cylindrical member 14, on the other hand, has a generally cylindrical bottomed shape of large diameter comprising a floor wall 48 and peripheral wall 50. A large diameter through hole 52 is formed in the center of the floor wall 48, and a retaining cylinder 54 protruding axially downward is integrally formed at the peripheral edge of the opening of the through hole 52. A lower diaphragm 56 is disposed as a flexible film in the through hole 52 formed in the floor wall 48. The outer circumferential edge of the lower diaphragm 56 is bonded by vulcanization to the retaining cylinder 54, so that the through hole 52 formed in the floor wall 48 of the outer cylindrical member 14 is fluid-tightly closed by the lower diaphragm 56. The lower diaphragm 56 also has some slack, so that deformation can readily be accommodated.

The peripheral wall 50, on the other hand, extends straight in the axial direction, having a round shape of greater diameter than the metal sleeve 28, its axial length being generally the same as that of the metal sleeve 28. A window opening 58 is formed in the axial intermediate portion in the peripheral wall 50, and in this embodiment, the window opening 58 is smaller than the opening of the pockets 42. Incidentally, in this embodiment, the axial opening width of the window opening 58 is slightly smaller than the axial opening width of the pockets 42, and the circumferential opening width of the window opening 58 is about ⅓ that of the pockets 42. The outer peripheral edge of a side diaphragm 60 is thus bonded by vulcanization as the movable rubber layer to the peripheral edge of the opening of the window opening 58 formed in the peripheral wall 50, so that the window opening 58 is fluid-tightly closed the side diaphragm 60. In this embodiment, the side diaphragm 60 is designed to slacken inward in the axis-perpendicular direction of the peripheral wall 50, and is as thick as the combined thickness of the peripheral wall 50 and a seal rubber layer 62 described below. The side diaphragm 60 is also formed with the same material as the lower diaphragm 56.

In addition, a thin-walled seal rubber layer 62 integrally formed with the side diaphragm 60 is formed on the inner circumferential surface of the peripheral wall 50, across generally the entire surface. In this embodiment, in particular, the seal rubber layer 62 is also integrally formed with the lower diaphragm 56. In short, the lower diaphragm 56, the side diaphragm 60, and the seal rubber layer 62 are integrally formed with the same rubber material.

The outer cylindrical member 14 having this structure is fitted and fixed to the large diameter cylindrical portion 34 by being constricted on all sides to reduce the diameter while one axial end is fitted to the integrally vulcanized molded article 38 of the rubber elastic body 16, and the one axial end (edge of open end) is positioned in the radially outward direction of the large diameter cylindrical portion 34 of the metal sleeve 28.

When the outer cylindrical member 14 is thus fitted and fixed to the metal sleeve 28, the inner shaft member 12 is inserted into the opening of the outer cylindrical member 14, so that the inner shaft member 12 and outer cylindrical member 14 are positioned on the same center axis.

While the outer cylindrical member 14 is thus fitted and fixed to the metal sleeve 28, the axial bottom end face of the metal sleeve 28 abuts the floor wall 48 of the outer cylindrical member 14, so that the metal sleeve 28 is positioned axially relative to the outer cylindrical member 14. In addition, the seal rubber layer 62 is interposed in a compressed state between the surfaces where the metal sleeve 28 and outer cylindrical member 14 are in contact with each other.

In addition, when the outer cylindrical member 14 is thus fitted and fixed to the metal sleeve 28, the opening of the outer cylindrical member 14 on the peripheral wall 50 side is fluid-tightly closed by the rubber elastic body 16, so that a fluid chamber 64 in which an non-compressible fluid is sealed is formed between the facing surfaces of the rubber elastic body 16 and lower diaphragm 56. Examples of sealed fluids which can be used include water, alkylene glycols, polyalkylene glycols, silicone oils, and mixtures thereof. The use of a low viscosity fluid with a viscosity no greater than 0.1 Pa·s is particularly desirable in order to effectively obtain damping effects based on the resonance action of the fluid flowing through a communication passage 82 described below.

A partition member 66 which is generally disk-shaped as a whole is disposed expanding in the axis-perpendicular direction in the fluid chamber 64. The partition member 66 is formed by superposing a thin-walled disk-shaped lid fixture 70 on the upper surface of a thick-walled disk-shaped partition fixture 68, and the outer peripheral edges of the thin-walled disk-shaped lid fixture 70 and thick-walled disk-shaped partition fixture 68 are intimately superposed on each other and held under pressure between the floor wall 48 of the outer cylindrical member 14 and the axial bottom end face of the outer peripheral edge of the rubber elastic body 16, so as to be housed between the facing surfaces of the lower diaphragm 56 and rubber elastic body 16.

When the partition member 66 is housed in this manner between the facing surfaces of the lower diaphragm 56 and the rubber elastic body 16, the fluid chamber 64 formed between the facing surfaces of the lower diaphragm 56 and rubber elastic body 16 is vertically divided by the partition member 66. Part of the wall is thus formed by the rubber elastic body 16 on the upper side of the partition member 66, forming a primary fluid chamber 72 in which pressure fluctuations are produced on the basis of the elastic deformation of the rubber elastic body 16 when vibrations are input, whereas on the bottom side of the partition member 66, part of the wall is formed by the lower diaphragm 56, forming an auxiliary fluid chamber 74 in which changes in volume can be readily accommodated on the basis of the deformation of the lower diaphragm 56.

A recess 76 that is open at the outer circumferential surface and extends in the circumferential direction is formed to a length about ¾ of the circumference in the partition fixture 68, and the opening of the recess 76 is fluid-tightly closed by the outer cylindrical member 14. This results in the formation of a communication passage 82, the outer periphery of the partition member 66 being extended in the circumferential direction, with one end in the circumferential direction connected to the primary fluid chamber 72 through a communication hole 78, and the other end in the circumferential direction connected to the auxiliary fluid chamber 74 through a communication hole 80. The fluid flows between the primary fluid chamber 72 and auxiliary fluid chamber 74 through the communication passage 82. In this embodiment, the length, cross section area, and the like of the communication passage 82 are adjusted so as to bring about high attenuation effects against vibrations in the low frequency range, corresponding to engine shake, based on the resonance action of the fluid flowing through the communication passage 82.

A round center recess 84 open at the top is formed in the center portion of the partition fixture 68, and the opening of the center recess 84 is covered by the lid fixture 70. A flexible rubber plate 86 in the form of a disk of a certain thickness is housed in the center recess 84. An annular support 88 with thicker walls then the center portion is formed in the flexible rubber plate 86, and the annular support 88 is pinched between the partition fixture 68 and lid fixture 70. As a result, the flexible rubber plate 86 is disposed in a state where a certain level of axial elastic deformation can be accommodated in the middle of the center recess 84.

A plurality of through holes 90 are provided in both vertical walls of the center recess 84 formed by the partition fixture 68 and lid fixture 70, and the fluid pressure in the primary fluid chamber 72 and auxiliary fluid chamber 74 is exerted through the through holes 90 onto the upper and lower surfaces of the flexible rubber plate 86 disposed in the center recess 84. The flexible rubber plate 86 is elastically deformed based on the difference between the fluid pressure in the primary fluid chamber 72 exerted on the upper surface of the flexible rubber plate 86 and the fluid pressure in the auxiliary fluid chamber 74 exerted on the lower surface of the flexible rubber plate 86. This substantially causes the flow of fluid between the primary fluid chamber 72 and auxiliary fluid chamber 74 through the center recess 84 and the through holes 90 formed in the partition fixture 68 and lid fixture 70, respectively, according to the level of elastic deformation in the flexible rubber plate 86, thereby attenuating or absorbing the fluctuations in the pressure of the primary fluid chamber 72.

In this embodiment, the level of the elastic deformation of the flexible rubber plate 86 is limited by the elasticity of the flexible rubber plate 86 and the contact of the flexible rubber plate 86 on the inner surface of the center recess 84, so that during the input of vibrations in a narrow range of high frequencies, such as booming noises, the fluctuations in the pressure of the primary fluid chamber 72 can be beneficially absorbed or attenuated on the basis of the elastic deformation of the flexible rubber plate 86, whereas the level of elastic deformation in the flexible rubber plate 86 is limited during the input of vibrations with a broader range of low frequencies, such as engine shake, thus prompting beneficial pressure fluctuations in the primary fluid chamber 72.

Furthermore, the outer cylindrical member 14 is fitted and fixed to the metal sleeve 28, so that the windows 36, 36 of the metal sleeve 28 are fluid-tightly closed by the outer cylindrical member 14. As a result, the openings of the pair of pockets 42, 42 are closed by the outer cylindrical member 14, forming a pair of fluid chambers 92, 92 in which a non-compressible fluid is sealed. The same non-compressible fluid sealed in the fluid chamber 64 is sealed in both of the pair of fluid chambers 92, 92.

In this embodiment, when the outer cylindrical member 14 is fitted and fixed to the metal sleeve 28, the window opening 58 formed in the peripheral wall 50 of the outer cylindrical member 14 is positioned in the radial outward direction of either of the pair of windows 36, 36 formed in the metal sleeve 28, so that the side diaphragm 60 is positioned in the radial outward direction of either of the pair of pockets 42, 42.

As a result, in this embodiment, by means of either of the pair of fluid chambers 92, 92, a equilibrium chamber 94 is formed, in which part of the wall is formed by the side diaphragm 60, allowing changes in volume to be readily accommodated on the basis of the deformation of the side diaphragm 60, whereas by means of the other fluid chamber 92, a pressure receiving chamber 96 is formed, in which part of the wall is formed by the rubber elastic body 16, so that fluctuations in pressure are produced directly in conjunction with the elastic deformation of the rubber elastic body 16 during vibration input.

When the pair of fluid chambers 92, 92 (pressure receiving chamber 96 and equilibrium chamber 94) are formed as described above, there is formed by means of one of the opening holes 46, a fluid passage 98 on the pressure receiving chamber 96 side. One end (radial outside end) of the fluid passage 98 opens into the pressure receiving chamber 96, and the other end (radial inside end) is fluid-tightly closed by the movable rubber layer 27. By means of the other opening hole 46 there is formed a fluid passage 100 on the equilibrium chamber 94 side, in which one end (radial outside end) opens into the equilibrium chamber 94, and the other end (radial inside end) is fluid-tightly closed by the movable rubber layer 27.

The fluid pressure in the pressure receiving chamber 96 and equilibrium chamber 94 is exerted onto the movable rubber layer 27 through the fluid passage 98 on the pressure receiving chamber 96 side and the fluid passage 100 on the equilibrium chamber 94 side. The movable rubber layer 27 is elastically deformed based on the difference between the pressure in the pressure receiving chamber 96 exerted on the surface of the movable rubber layer 27 on the pressure receiving chamber 96 side and the pressure in the equilibrium chamber 94 exerted on the surface of the movable rubber layer 27 on the equilibrium chamber 94 side, resulting substantially in the flow of fluid between the pressure receiving chamber 96 and equilibrium chamber 94 through the fluid passage 98 on the pressure receiving chamber 96 side and the fluid passage 100 on the equilibrium chamber 94 side according to the level of the elastic deformation of the movable rubber layer 27.

With this substantial flow of fluid between the pressure receiving chamber 96 and equilibrium chamber 94 through the fluid passage 98 on the pressure receiving chamber 96 side and the fluid passage 100 on the equilibrium chamber 94 side, the fluid passage 98 on the pressure receiving chamber 96 side and the fluid passage 100 on the equilibrium chamber 94 side function in exactly the same way as a fluid passage. In other words, with this substantial flow of fluid between the pressure receiving chamber 96 and equilibrium chamber 94 through the fluid passage 98 on the pressure receiving chamber 96 side and the fluid passage 100 on the equilibrium chamber 94 side, the movable rubber layer 27 ceases to function as a barrier wall dividing the fluid passage 98 on the pressure receiving chamber 96 side and the fluid passage 100 on the equilibrium chamber 94 side, and allows, on the basis of its deformation, the fluid to flow through the fluid passage 98 on the pressure receiving chamber 96 side and the fluid passage 100 on the equilibrium chamber 94 side.

In this embodiment, the length, cross section area, and the like of the fluid passage 98 on the pressure receiving chamber 96 side and the fluid passage 100 on the equilibrium chamber 94 side are adjusted so that low dynamic spring effects against vibrations in the high frequency range corresponding to booming noises or the like to be achieved based on the resonance action and the like of the fluid flowing through the fluid passage 98 on the pressure receiving chamber 96 side and the fluid passage 100 on the equilibrium chamber 94 side.

A cylindrical or tubular orifice member 102 is disposed between the axial-perpendicular facing surfaces of the outer cylindrical member 14 and metal sleeve 28. As illustrated in FIGS. 4-7, the tubular orifice member 102 is generally cylindrical, with a circumferential length that is at least half the circumference (a length about ¾ of the circumference in this embodiment), and is formed by means of a hard material such as synthetic resin or metal. The inside diameter of the tubular orifice member 102 is slightly greater than the outside diameter of the small diameter cylindrical portion 30 in the metal sleeve 28, whereas the outside diameter of the tubular orifice member 102 is about the same as the outside diameter of the large diameter cylindrical portion 34 in the metal sleeve 28. Furthermore, the tubular orifice member 102 is assembled with the metal sleeve 28 by being inserted axially upward through the small diameter cylindrical portion 30 in the metal sleeve 28. With the tubular orifice member 102 thus assembled with the metal sleeve 28 in this way, the upper end of the tubular orifice member 102 extends to the window 36, being positioned in the axial intermediate portion of the window 36. On the other hand, the bottom end of the tubular orifice member 102 is positioned in contact with the floor wall 48 of the outer cylindrical member 14, and is pinched along the entire circumference between the peripheral wall 50 of the outer cylindrical member 14 and the opening side edge of the small diameter cylindrical portion 30 of the metal sleeve 28. In this embodiment, the tubular orifice member 102 is positioned where the side diaphragm 60 will not to circumferentially cross over the radially outward positioned pocket 42, so as not to interfere with the deformation of the side diaphragm 60. In particular in this embodiment, the side diaphragm 60 is positioned at the circumferentially divided part of the tubular orifice member 102.

A recess 104 that is circumferentially reciprocal, corrugated, or the like is formed open at the outer circumferential surface in the tubular orifice member 102. One end of the recess 104 is connected to one fluid chamber 92 (pressure receiving chamber 96) through a through hole 106 in the floor wall of the recess 104, and the other circumferential end of the recess 104 is connected to the other fluid chamber 92 (equilibrium chamber 94) through a through hole 108 in the floor wall of the recess 104. The recess 104 is fluid-tightly covered by the peripheral wall 50 of the outer cylindrical member 14, so that an orifice passage 110 through which the pair of fluid chambers 92, 92, that is, the pressure receiving chamber 96 and equilibrium chamber 94, communicate with each other, is formed in such a way as to extend along the inner circumferential surface of the peripheral wall 50 of the outer cylindrical member 14. In this embodiment, the length, cross section area, or the like of the orifice passage 110 is adjusted so as to bring about highly attenuating effects on low frequency vibrations such as engine shake, on the basis of the resonance action of the fluid flowing between the pressure receiving chamber 96 and equilibrium chamber 94 through the orifice passage 110. A notched hole 112 of suitable shape and size is formed in the tubular orifice member 102 of this embodiment.

The deformation of the movable rubber layer 27 is limited by its elasticity because of the considerable difference in the internal pressure produced in the pressure receiving chamber 96 and equilibrium chamber 94 during the input of vibrations in the low frequency range, such as engine shake. This prevents the movable rubber layer 27 from absorbing the difference in internal pressure to ensure the adequate flow of fluid through the orifice passage 110, so as to effectively bring about damping effects based on the resonance action of the fluid flowing through the orifice passage 110.

In this embodiment, when the tubular orifice member 102 is fitted to the metal sleeve 28, the diameter of the metal sleeve 28 is first reduced by being constricted on all sides, for example, so that preliminary compression is exerted on the rubber elastic body 16. Accordingly, tensile stress produced in the rubber elastic body 16 when the rubber elastic body 16 is vulcanized and molded can be attenuated or neutralized to improve the durability and withstand load of the rubber elastic body 16.

An attachment bracket 114 is attached to the engine mount 10 having this structure. The attachment bracket 114 is in the form of an inverted cup, as a whole comprising an upper floor 116 and a cylindrical portion 118. A radially outward protruding attachment flange 120 is integrally formed with the open end. The attachment bracket 114 having this structure is assembled with the engine mount 10 by fitting and fixing the cylindrical portion 118 to the peripheral wall 50 of the outer cylindrical member 14. With the attachment bracket 114 thus assembled with the engine mount 10, the inner shaft member 12 protrudes above the upper floor 116 from an insertion hole 122 formed in the upper floor 116.

In this embodiment, a through hole 124 is formed in the cylindrical portion 118 of the attachment bracket 114 for positioning on the outside of the window opening 58 fluid-tightly closed by the side diaphragm 60 while the attachment bracket 114 is assembled on the engine mount 10, so that atmospheric pressure is exerted on the side diaphragm 60.

The engine mount 10 on which the attachment bracket 114 has thus been assembled is such that the attachment fixing portion 18 of the inner shaft member 12 is fixed to the power unit (not shown) by a bolt (not shown) that is inserted into the attachment hole 126 in the attachment fixing portion 18, while the outer cylindrical member 14 is fixed to the automobile body by a bolt (not shown) that is inserted into a bolt through hole 128 formed in the attachment flange 120. With this arrangement, the power unit is supported in a vibration-damped manner on the body. In this embodiment, the engine mount 10 is mounted on a vehicle, with the radial direction in which the pressure receiving chamber 96 and equilibrium chamber 94 are facing oriented in the generally longitudinal direction of the vehicle.

Relative differences in pressure are produced between the primary fluid chamber 72 and auxiliary fluid chamber 74 when generally vertical vibrations are input between the inner shaft member 12 and outer cylindrical member 14 while the engine mount 10 is mounted on the vehicle in the manner described above. When vibrations in a broad range of low frequencies such as engine shake are input in the generally vertical direction between the inner shaft member 12 and outer cylindrical member 14, highly attenuating effects are brought about on the basis of the resonance action of the fluid flowing through the communication passage 82. When vibrations in a narrow range of high frequencies such as booming noises are input in the generally vertical direction between the inner shaft member 12 and outer cylindrical member 14, the fluctuations in the pressure of the primary fluid chamber 72 are absorbed or attenuated on the basis of the elastic deformation of the flexible rubber plate 86, resulting in vibration insulating effects due to the low dynamic spring action.

On the other hand, relative differences in pressure are produced between the pressure receiving chamber 96 and equilibrium chamber 94 when vibrations are input in the generally horizontal direction (generally longitudinal direction of vehicle) between the inner shaft member 12 and outer cylindrical member 14 while the engine mount 10 is mounted on the vehicle in the manner described above. When vibrations in a broad range of low frequencies such as engine shake are input in the generally horizontal direction (generally longitudinal direction of vehicle) between the inner shaft member 12 and outer cylindrical member 14, highly attenuating effects are brought about on the basis of the resonance action of the fluid flowing through the orifice passage 110. Vibrations in a narrow range of high frequencies such as booming noises input in the generally horizontal direction (generally longitudinal direction of vehicle) between the inner shaft member 12 and outer cylindrical member 14 will result substantially in the flow of fluid through the fluid passage 98 on the pressure receiving chamber 96 side and the fluid passage 100 on the equilibrium chamber 94 side; and thus in low dynamic spring effects based on the resonance action of the fluid flowing through the fluid passage 98 on the pressure receiving chamber 96 side and the fluid passage 100 on the equilibrium chamber 94 side.

Effective damping effects can be brought about both in the tuned frequency range of the orifice passage 110 as well as the tuned frequency range of the fluid passage 98 on the pressure receiving chamber 96 side and the fluid passage 100 on the equilibrium chamber 94 side when vibrations are input in the axis-perpendicular direction between the inner shaft member 12 and outer cylindrical member 14 in the engine mount 10 of this embodiment.

In particular, because the location where the movable rubber layer 27 is disposes is inside the through hole 26 formed in the inner shaft member 12, conventional dead space can be effectively exploited to bring about effective damping effects against vibrations input in a plurality of frequency ranges without increasing the overall size of the engine mount 10.

The movable rubber layer 27 is integrally formed with the rubber elastic body 16, but the outer peripheral edges of the movable rubber layer 27 are bonded by vulcanization to the inner circumferential surface of the through hole 26 formed in the inner shaft member 12, allowing the movable rubber layer 27 to be substantially separate from the rubber elastic body 16. The movable rubber layer 27 can be formed in this way in order to prevent adverse effects on the durability or basic spring properties of the engine mount 10 which may be caused by the rubber elastic body 16.

In this embodiment, effective damping performance can be obtained for vibrations in the axis-perpendicular direction as well as in the axial direction, since the damping effects are based on the resonance action of the fluid flowing through the communication passage 82 through which the primary fluid chamber 72 and auxiliary fluid chamber 74 communicate with each other when vibrations are input in the axial direction between the inner shaft member 12 and outer cylindrical member 14.

In this embodiment, the pair of fluid chambers 92, 92 are formed in facing positions on both sides, in the radial direction, of the inner shaft member 12, such that, by either of the pair of fluid chambers 92, 92, the equilibrium chamber 94 is formed, in which part of the wall is formed by the side diaphragm 60, and by means of the other fluid chamber 92, a pressure receiving chamber 96 is formed, in which part of the wall is formed by the rubber elastic body 16. Therefore, fluctuations in pressure are produced directly in conjunction with the elastic deformation of the rubber elastic body 16 when vibrations are input in generally the horizontal direction (generally longitudinal direction of the vehicle) between the inner shaft member 12 and outer cylindrical member 14. It is thus possible to adjust the wall spring rigidity of the equilibrium chamber 94 by adjusting the spring properties of the side diaphragm 60.

Accordingly, in this embodiment, the wall spring rigidity of the equilibrium chamber 94 can be adjusted with a greater degree of freedom without altering the spring properties of the rubber elastic body 16 which affects the axial support spring rigidity and the like. Also, the range of frequencies in which damping effects can be brought about on the basis of the resonance properties of the fluid flowing through the orifice passage 110 can thus be tuned with a greater degree of freedom.

In this embodiment, the orifice passage 110 links the pressure receiving chamber 96 and equilibrium chamber 94 together, thus making it possible to control the peaky properties of the damping effects brought about on the basis of the resonance action of the fluid flowing through the orifice passage 110. This also makes it possible to expand the range of frequencies amenable to damping effects brought about on the basis of the resonance action of the fluid flowing through the orifice passage 110.

In addition, in this embodiment, no dead space or the like is formed in connectors 43, 43 formed so as to radially extend perpendicular to the radial direction in which the pair of pockets 42, 42 are facing, that is, the radial direction in which the pressure receiving chamber 96 and equilibrium chamber 94 are facing. This arrangement allows the rubber volume of the connectors 43, 43 to be increased, so that a greater spring ratio can be established in the radial direction perpendicular to the direction in which the pressure receiving chamber 96 and equilibrium chamber 94 are facing and the radial direction in which the pressure receiving chamber 96 and equilibrium chamber 94 are facing.

Thus, in this embodiment, when vibrations are input in the radial direction in which the pressure receiving chamber 96 and equilibrium chamber 94 are facing, it is possible to bring about damping effects based on the resonance action of the fluid flowing through orifice passage 110. On the other hand, when vibrations are input in the radial direction perpendicular to the direction in which the pressure receiving chamber 96 and equilibrium chamber 94 are facing, the pair of connectors 43, 43 compress/expand, making it possible to obtain effective high dynamic spring properties by the rubber elastic body 16.

Figure 8:
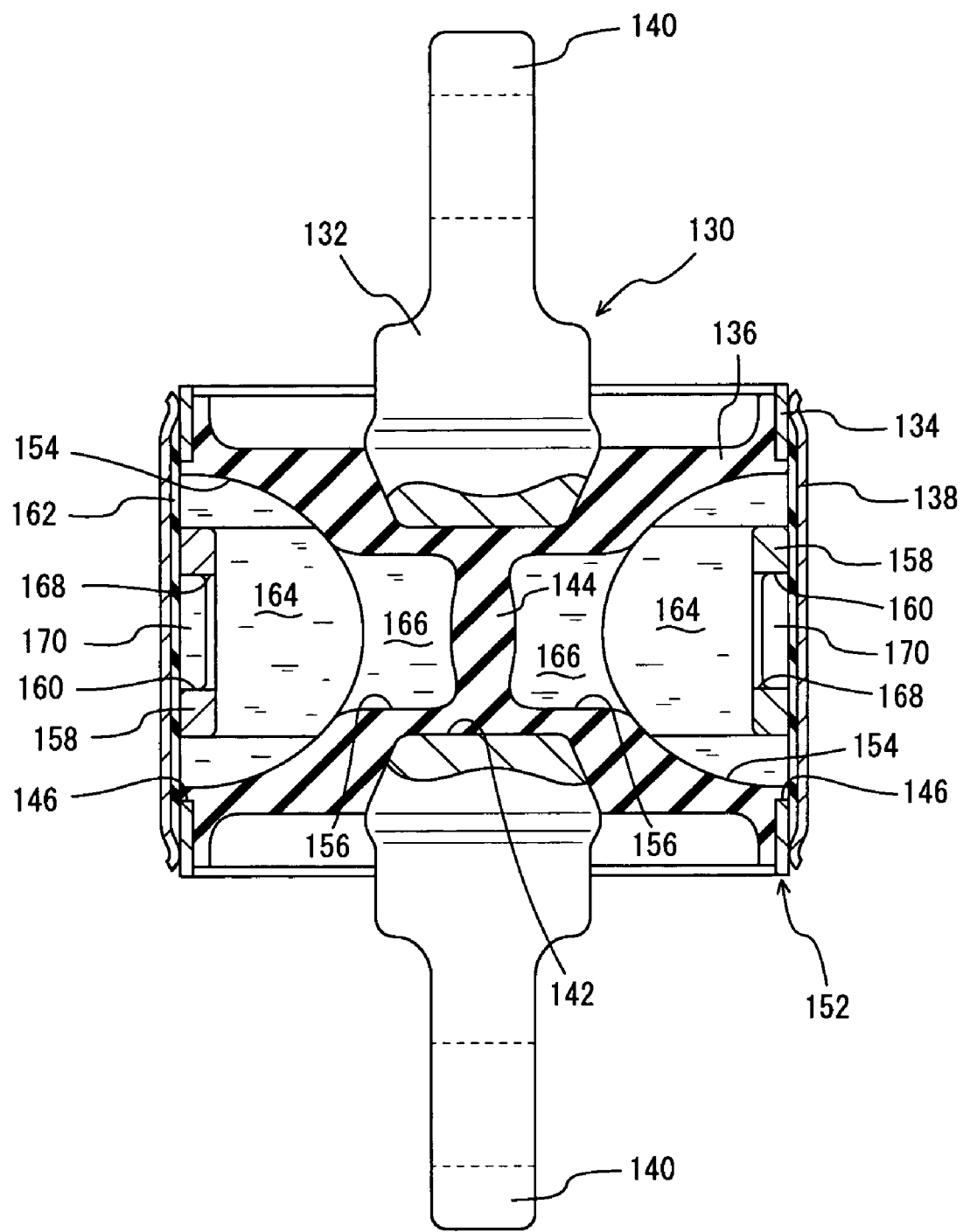
FIG. 8 is an elevational view in axial or vertical cross section of a fluid-filled vibration damping device in the form of an damping bushing of construction according to a second embodiment of the invention, taken along line 8-8 of FIG. 10.
Figure 9:
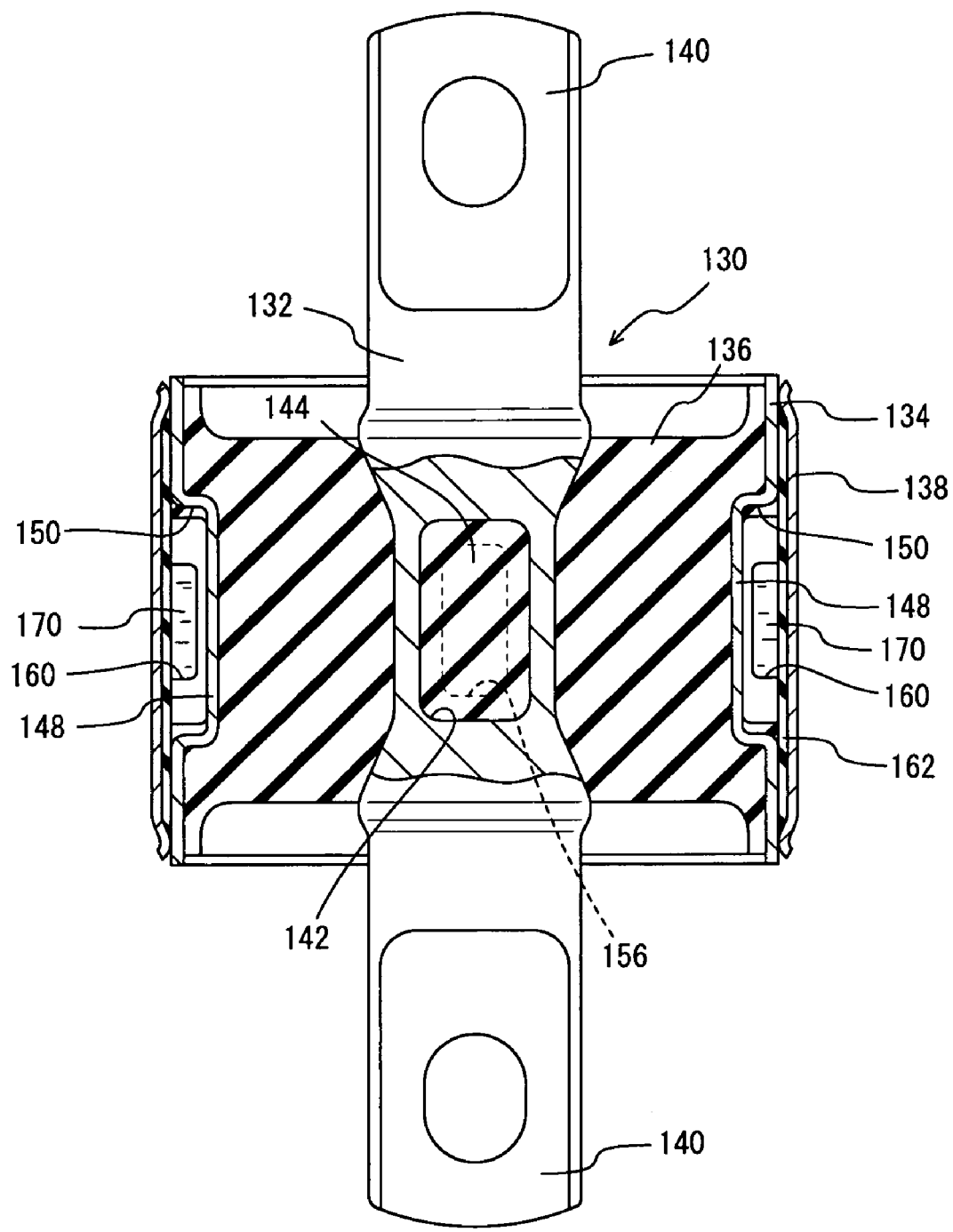
FIG. 9 is a cross sectional view taken along line 9-9 of FIG. 10.
Figure 10:
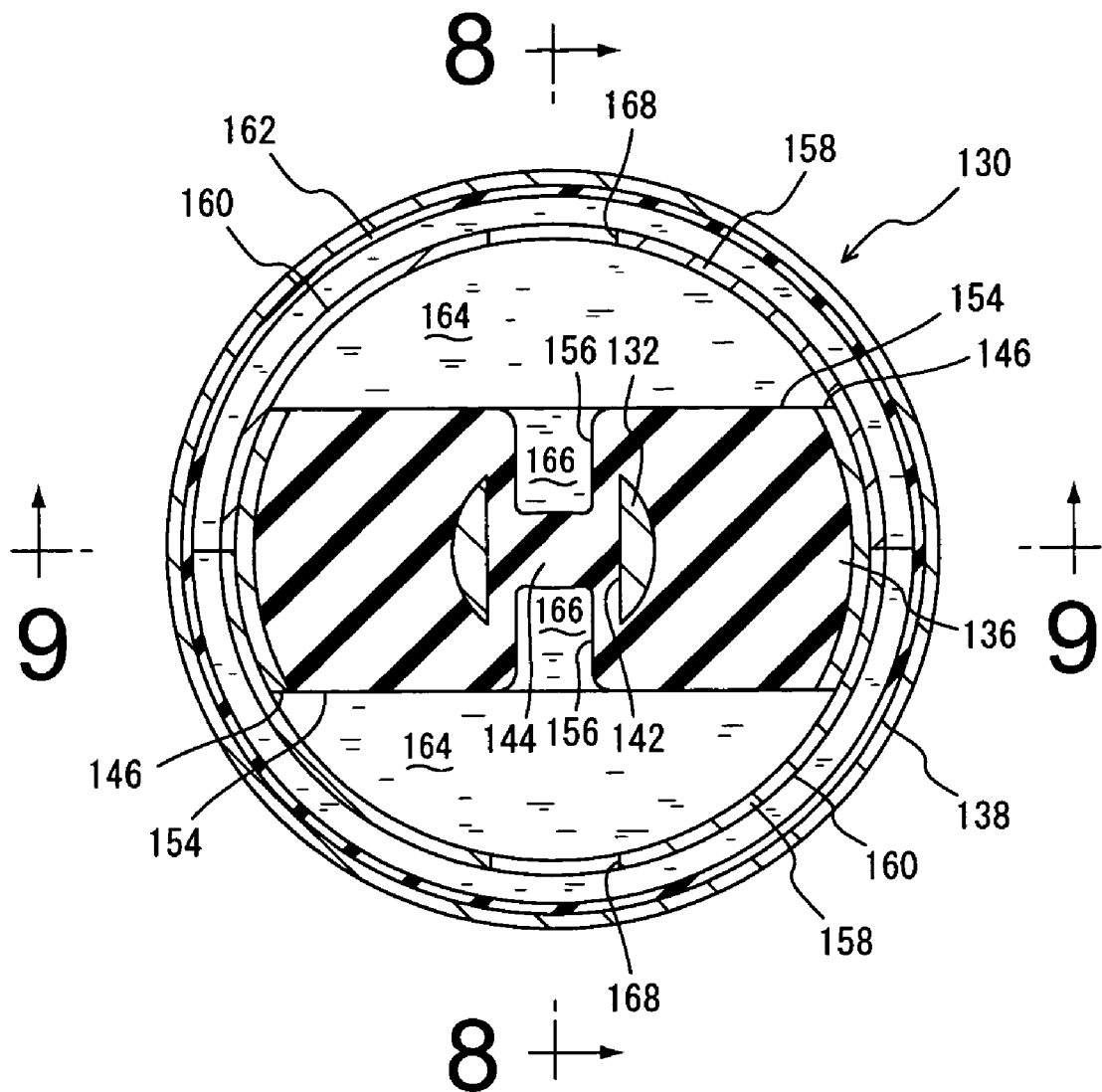
FIG. 10 is a cross sectional view taken along line 10-10 of FIG. 8.

FIGS. 8-10 illustrate a damping bushing 130 in a second embodiment of the invention. In the damping bushing 130, a metal sleeve 134 and an inner shaft member 132 as the inner shaft disposed radially apart from each other are linked by a rubber elastic body 136, and an outer cylindrical member 138 as the outer cylinder is fitted and fixed to the metal sleeve 134. The damping bushing 130 is mounted between members joined in a damped manner by attaching the inner shaft member 132 and outer cylindrical member 138 to one of the members joined in a damped manner.

More specifically, the inner shaft member 132 is, in the form of a solid small diameter rod, an attachment fixing portion 140 being integrally formed with both axial ends. A through hole 142 is formed in the inner shaft member 132, passing axis-perpendicularly through the intermediate portion. In this embodiment, the through hole 142 is formed so as to extend straight in the axis-perpendicular direction of the inner shaft member 132, with a generally constant rectangular cross section.

A movable rubber layer 144 is disposed in the through hole 142 formed in the inner shaft member 132, and the outer peripheral edge of the movable rubber layer 144 is bonded by vulcanization to the inner circumferential surface of the through hole 142. The through hole 142 is thus fluid-tightly closed by the movable rubber layer 144. In this embodiment, the movable rubber layer 144 is disposed in generally the center in the direction in which the through hole 142 extends, so that the through hole 142 is fluid-tightly closed by the movable rubber layer 144 in the center portion in the direction in which the through hole 142 extends.

The metal sleeve 134 has a cylindrical shape with a greater diameter than the inner shaft member 132, and is axially shorter than the inner shaft member 132. The metal sleeve 134 is disposed apart from the inner shaft member 132 in the outward radial direction, on generally the same center axis as the inner shaft member 132. The inner shaft member 132 is disposed so as to extend axially through the metal sleeve 134. A pair of window openings 146, 146 extending circumferentially to a certain axial width are formed at a part facing radially in the metal sleeve 134. Small diameter portions 148 are formed in the axial intermediate portion of the metal sleeve 134 in the peripheral edges of the window openings 146, 146. A recess 150 extending circumferentially between the peripheral edges of the window openings 146, 146 is formed by the small diameter portions 148.

The rubber elastic body 136 has a thick-walled cylindrical form as a whole and is disposed between the radially facing surfaces of the inner shaft member 132 and metal sleeve 134, the outer peripheral surface being bonded by vulcanization to the metal sleeve 134. That is, the rubber elastic body 136 is formed as an integrally vulcanized molded article 152 comprising the inner shaft member 132 and metal sleeve 134. The outer peripheral surface of the metal sleeve 134 is substantially directly exposed to the outer peripheral surface of the integrally vulcanized molded article 152. The axis-perpendicular direction facing surfaces of the inner shaft member 132 and metal sleeve 134, that is, the radially facing surfaces, are linked by the rubber elastic body along substantially the entire axial length. A pair of pockets 154, 154 open at the peripheral surface are also formed in the rubber elastic body 136 at a location facing one way in the radial direction. These pockets 154, 154 are open at the outer peripheral surface through the window openings 146, 146 of the metal sleeve 134.

Opening holes 156 open at the wall surface of the pockets 154 are also formed in the rubber elastic body 136. The opening holes 156 are formed so as to extend straight, by means of a generally fixed cross section, in the direction in which the through hole 142 extends, using the movable rubber layer 144 as a common floor wall. That is, in this embodiment, the two opening holes 156, 156 are formed so as to extend straight in the outward radial direction, with a generally constant cross section, on both sides, in the radial direction, of the movable rubber layer 144. In this embodiment, the rubber elastic body 136 extends as far as the inner circumferential surface of the through hole 142, and the rubber elastic body 136 is integrally formed with the movable rubber layer 144 in the portion extending as far as the inner circumferential surface of the through hole 142. Thus, in this embodiment, by means of a generally rectangular cross section that is smaller around than the through hole 142, the opening holes 156 are formed so as to extend straight in the direction in which the through hole 142 extends. Also in this embodiment, the opening holes 156 are formed with generally the same dimension in the direction of extension (direction of depth), cross sectional shape, and cross sectional size.

A pair of metallic orifice member 158, 158 are also incorporated in the integrally vulcanized molded article 152. The orifice members 158 have a generally semi-cylindrical shape, and are formed by recesses 160, extending linearly from one peripheral end to the other, which are open at the peripheral surface. The pair of orifice members 158, 158 are assembled on both sides, in the radial direction, of the integrally vulcanized molded article 152, each orifice member 158 extending along the peripheral surface through the window openings 146 of the metal sleeve 134, and the two peripheral ends of the orifice members 158 being positioned and supported by being fitted into the recess 150 of the window openings 146 of the metal sleeve 134. With the pair of orifice members 158, 158 thus assembled with the integrally vulcanized molded article 152, the peripheral recesses 160, 160 of the pair of orifice members 158, 158 are joined together at the open ends on both sides in the circumferential direction, so as to extend continuously around the entire circumference.

The outer cylindrical member 138 is also fitted and fixed to the integrally vulcanized molded article 152. The outer cylindrical member 138 has cylindrical shape with a diameter slightly larger than that of the metal sleeve 134 but about the same axial length, a seal rubber layer 162 of generally constant thickness being bonded by vulcanization to the inner circumferential surface.

The outer cylindrical member 138 is fitted to the integrally vulcanized molded article 152, and is then constricted on all sides or the like to reduce the diameter, so as to be fitted and fixed to the metal sleeve 134. The inner shaft member 132 thus extends axially through the outer cylindrical member 138, and the axis-perpendicularly facing surfaces of the inner shaft member 132 and the outer cylindrical member 138, that is, the radially facing surfaces, are linked by the rubber elastic body 136 along substantially the entire axial length. The outer cylindrical member 138 is fitted and fixed to the metal sleeve 134, so that the window openings 146, 146 of the metal sleeve 134 are fluid-tightly closed by the outer cylindrical member 138. The window openings 146, 146 of the metal sleeve 134 are thus fluid-tightly closed by the outer cylindrical member 138, forming a pair of fluid chambers 164, 164 in which an non-compressible fluid is sealed. In addition, the seal rubber layer 162 is pinched between the superposed surfaces of the metal sleeve 134 and outer cylindrical member 138, ensuring the fluid-tightness of the fluid chambers 164, 164.

When the pair of fluid chambers 164, 164 are formed in this way, there is formed by means of one of the opening holes 156, one fluid passage 166, in which one end (radial outside end) opens into one fluid chamber 164, and the other end (radial inside end) is fluid-tightly closed by the movable rubber layer 144, and by means of the other opening hole 156 there is formed the other fluid passage 166, in which one end (radial outside end) opens into the other fluid chamber 164, and the other end (radial inside end) is fluid-tightly closed by the movable rubber layer 144.

The fluid pressure in the fluid chambers 164, 164 is exerted onto, the movable rubber layer 144 through the two fluid passages 166, 166. The movable rubber layer 144 is elastically deformed based on the difference between the pressure in one fluid chamber 164 exerted on one side of the movable rubber layer 144 and the pressure in the other fluid chamber 164 exerted on the other side of the movable rubber layer 144, resulting substantially in the flow of fluid between the fluid chambers 164 through the fluid passages 166 according to the level of the elastic deformation of the movable rubber layer 144.

With this substantial flow of fluid between the fluid chambers 164 through the fluid passages 166, the two fluid passages 166 function in exactly the same way as one fluid passage. In other words, with this substantial flow of fluid between the fluid chambers 164, 164 through the fluid passages 166, 166, the movable rubber layer 144 ceases to function as a barrier wall dividing the two fluid passages 166, 166, and allows, on the basis of its deformation, the fluid to flow through the two fluid passages 166, 166.

In this embodiment, the length, cross section area, and the like of the two fluid passages 166 are adjusted so that vibration insulating effects based on low dynamic spring action against vibrations in the high frequency range corresponding to booming noises or the like can be achieved based on the resonance action and the like of the fluid flowing through the two fluid passages 166, 166.

The outer cylindrical member 138 is in contact under pressure via the seal rubber layer 162 around the outer circumferential surface of the orifice members 158, so that the orifice members 158 are fixedly supported by the metal sleeve 134 and outer cylindrical member 138. The circumferential intermediate portions of the peripheral recesses 160 formed continuously around the orifice members 158 are each open and communicate with one fluid chamber 164 through through holes 168 formed in the floor wall of the recesses 160. Orifice passages 170, 170 which extend along the outer circumference of the orifice members 158 to a length about one half the circumference to join the pair of fluid chambers 164, 164 to each other, allowing the non-compressible fluid to flow between the two fluid chambers 164, 164, are formed along the inner circumferential surface of the outer cylindrical member 138. In this embodiment, the length, cross section, and the like of the orifice passages 170, 170 are adjusted so as to achieve high attenuating effects against vibrations in the low frequency range, such as engine shake, based on the resonance action of the fluid flowing between the pair of fluid chambers 164, 164 through the orifice passages 170, 170.

The deformation of the movable rubber layer 144 is limited by its elasticity because of the considerable difference in the internal pressure produced in the pair of fluid chambers 164, 164 during the input of vibrations in the low frequency range, such as engine shake. This prevents the movable rubber layer 144 from absorbing the difference in internal pressure, an thus ensures the adequate flow of fluid through the orifice passages 170, 170, so as to effectively bring about damping effects based on the resonance action of the fluid flowing through the orifice passages 170, 170.

Relative differences in pressure are produced between the pair of fluid chambers 164, 164 when axis-perpendicular vibrations are input between the inner shaft member 132 and outer cylindrical member 138 in the cylindrical damping bushing 130 having this structure. When vibrations in a broad range of low frequencies such as engine shake are input in the axis-perpendicular direction between the inner shaft member 132 and outer cylindrical member 138, highly attenuating effects are brought about on the basis of the resonance action of the fluid flowing through the orifice passages 170, 170. Vibrations in a narrow range of high frequencies such as booming noises that are input in the axis-perpendicular direction between the inner shaft member 132 and outer cylindrical member 138 will substantially result in the flow of fluid through the two fluid passages 166, 166, allowing low dynamic spring effects to be obtained based on the resonance action of the fluid flowing through the two fluid passages 166, 166.

The movable rubber layer 144 is disposed inside the through hole 142 formed in the inner shaft member 132 in the damping bushing 130 having this structure, and the fluid passages 166 come to a stop at the movable rubber layer 144, allowing the same effects as in the first embodiment to be obtained.

Although several embodiments of the invention have been described above, they are ultimately only examples, and the invention should not be understood as being limited in any way by the specific descriptions of the embodiments.

Figure 11:
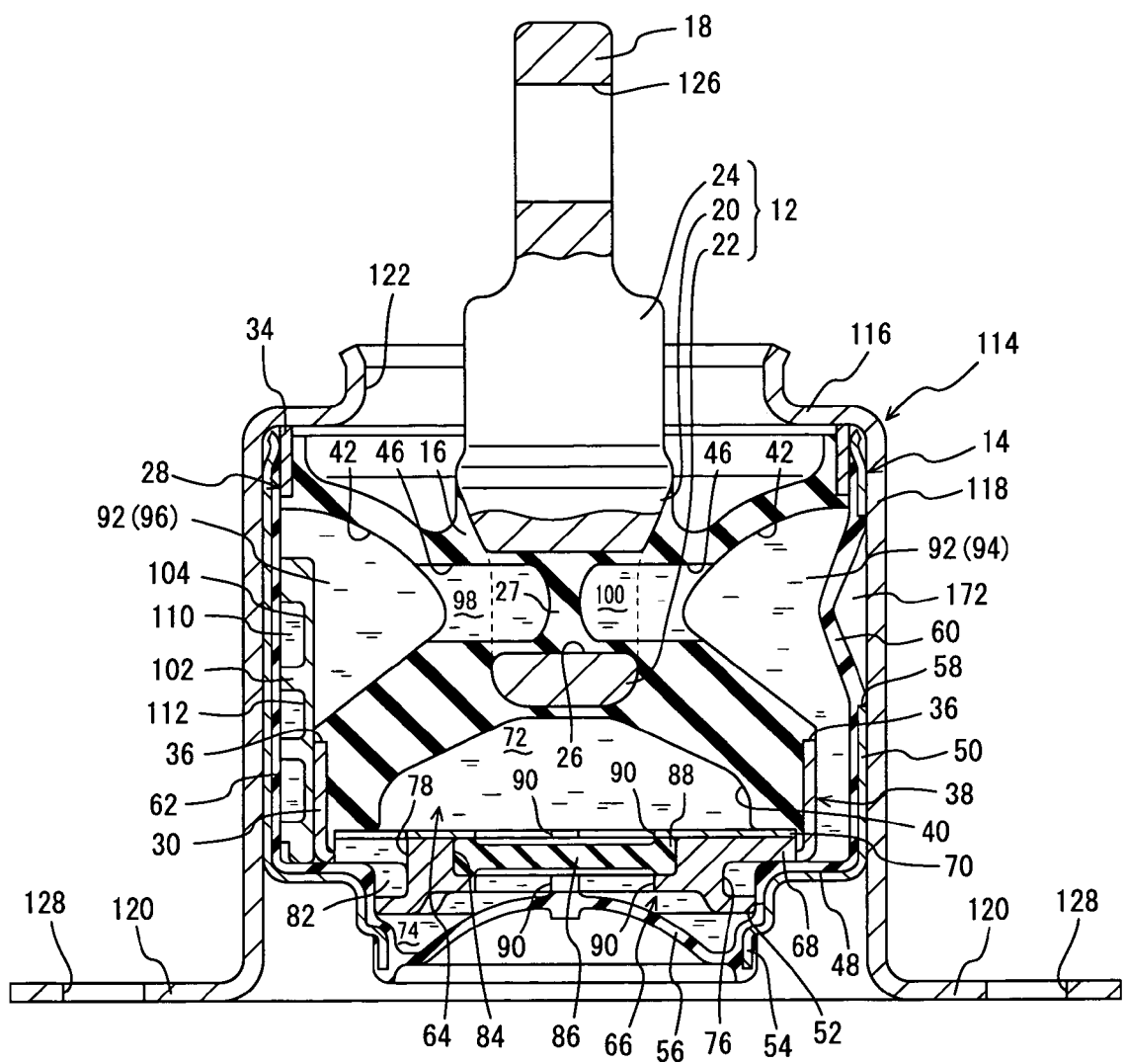
FIG. 11 is an elevational view in axial or vertical cross section of an engine mount of construction according to another embodiment of the invention.

For example, in the first embodiment, the attachment bracket 114 involves the use of a through hole 124 formed in a cylindrical portion 118, but as illustrated in FIG. 11, a type in which no through hole 124 is formed in the cylindrical portion 118 may also be used. In that case, the outside of the side diaphragm 60 will be covered by the cylindrical portion 118, forming a sealed air chamber 172 on the side opposite the equilibrium chamber 94, on both sides of the side diaphragm 60.

In the engine mount illustrated in FIG. 11, the spring properties of the side diaphragm 60 can thus be adjusted by utilizing the compressive elasticity of the air sealed in the air chamber 172, so that the damping effects based on the resonance action of the fluid flowing through the orifice passage 110 can be tuned with an ever greater degree of freedom.

Also, in the first embodiment, parts of the walls in the primary fluid chamber 72 and auxiliary fluid chamber 74 were formed by the flexible rubber plate 86, which absorbs pressure fluctuations in the high frequency range. However, the flexible rubber plate 86 may be designed according to the desired damping properties or the like, and is not always necessary to the invention.

Furthermore, the tuning frequencies, length and cross section area of the communication passage 82, fluid passage 98 on the pressure receiving chamber 96 side, fluid passage 100 on the equilibrium chamber 94 side, orifice passage 110, fluid passages 166, and orifice passages 170 may be determined as desired according to the desired vibration properties, and are not limited to those in the first and second embodiments.

In addition, in the first embodiment, only one window opening 58 was formed, but a plurality of window openings 58 may also be formed. The size of the window openings 58 is also not limited to that in the first embodiment.

In the first embodiment, the fluid passage 98 on the pressure receiving chamber 96 side and the fluid passage 100 on the equilibrium chamber 94 side were formed so as to extend straight in the direction in which the pressure receiving chamber 96 and equilibrium chamber 94 were facing, but the members forming a fluid passage in the form of a round block may be fitted and fixed to the inner shaft member 12, and a fluid passage may be formed along the periphery of the inner shaft member 12 between the surfaces in which the inner shaft member 12 and the members forming the fluid passage are facing.

In the first embodiment, the cross section of the through hole 26 was generally round, and in the second embodiment, the cross section of the through hole 142 was generally rectangular, but the cross sectional shape of the through holes is not limited to those in the first and second embodiments.

It is also to be understood that the present invention may be embodied with various other changes, modifications and improvements, which may occur to those skilled in the art, without departing from the spirit and scope of the invention defined in the following claims.

What is claimed is:

1. A fluid-filled vibration damping device comprising:
an inner shaft with a solid structure;
an outer cylinder disposed about the inner shaft with a certain radial distance therebetween;
a rubber elastic body interposed between and elastically connecting the inner shaft and the outer cylinder;
a pair of fluid chambers in which a non-compressible fluid is sealed are formed facing on both sides, in the axis-perpendicular direction, of the inner shaft;
an orifice passage through which the pair of fluid chambers communicate with each other;
a through hole formed through the inner shaft in the axis-perpendicular direction; and
a movable rubber layer fluid-tightly closing the through hole and being exposed at opposite major surfaces thereof to the pair of fluid chambers, respectively so that pressure in the respective fluid chambers are exerted against the major surfaces of the movable rubber layer,
wherein the movable rubber layer is integrally formed with the rubber elastic body.

2. A fluid-filled vibration damping device according to claim 1, wherein the orifice passage is formed along an inner circumferential surface of the outer cylinder.

3. A fluid-filled vibration damping device according to claim 1, further comprising a fluid passage formed in at least one of the pair of fluid chambers, extending from the one of the fluid chamber toward the movable rubber layer.

4. A fluid-filled vibration damping device according to claim 1, wherein the inner shaft has the solid structure inserted through one axial opening of the outer cylinder toward an axial intermediate portion thereof so that the one axial opening of the outer cylinder is fluid-tightly closed by the rubber elastic body that elastically links the inner shaft and the outer cylinder, while an other axial opening of the outer cylinder is fluid-tightly closed by a flexible film, and an axis-perpendicularly expanding partition member is disposed by being supported by the outer cylinder between axial facing surfaces of the rubber elastic body and the flexible film, so that a primary fluid chamber partially formed by the rubber elastic body and an auxiliary fluid chamber partially formed by the flexible film are formed on either side of the partition member, sealing the non-compressible fluid in the primary and auxiliary fluid chambers, and a communicating passage through which the primary and auxiliary fluid chambers communicate with each other is formed.

5. A fluid-filled vibration damping device according to claim 1, wherein the inner shaft has the solid structure extending axially through the outer cylinder, and facing surfaces of the inner shaft and outer cylinder in an axis-perpendicular direction are connected by the rubber elastic body along substantially an entire length in an axial direction thereof.

6. A fluid-filled vibration damping device comprising:
an inner shaft with a solid structure;
and outer cylinder disposed about the inner shaft with a certain radial distance therebetween;
a rubber elastic body interposed between and elastically connecting the inner shaft and the outer cylinder;
a pair of fluid chambers in which a non-compressible fluid is sealed are formed facing on both sides, in the axis-perpendicular direction, of the inner shaft;
an orifice passage through which the pair of fluid chambers communicate with each other;
a through hole formed through the inner shaft in the axis-perpendicular direction; and
a movable rubber layer fluid-tightly closing the through hole and being exposed at opposite major surfaces thereof to the pair of fluid chambers, respectively so that pressure in the respective fluid chambers are exerted against the major surfaces of the movable rubber layer,
wherein a pair of pockets having openings open in an outer circumferential surface of the rubber elastic body and being located on both sides in a diametric direction of the inner shaft, the openings of the pair of pockets being fluid-tightly covered by the outer cylinder so as to form the pair of fluid chambers, and wherein the outer cylinder includes a window opening provided in a portion covering one of the pair of fluid chambers, and the window opening is fluid-tightly closed by a diaphragm so that the one fluid chamber is partially formed by the diaphragm, thereby forming, by means of the pair of fluid chambers, a pressure receiving chamber partially formed by the rubber elastic body so that pressure fluctuations are directly produced in conjunction with an elastic deformation of the rubber elastic body when vibrations are input in the axis-perpendicular direction between the inner shaft and the outer cylinder, and an equilibrium chamber partially formed by the diaphragm so that changes in volume are readily accommodated through a deformation of the diaphragm.

7. A fluid-filled vibration damping device according to claim 6, wherein the inner shaft has the solid structure inserted through one axial opening of the outer cylinder toward an axial intermediate portion thereof so that the one axial opening of the outer cylinder is fluid-tightly closed by the rubber elastic body that elastically links the inner shaft and the outer cylinder, while an other axial opening of the outer cylinder is fluid-tightly closed by a flexible film, and an axis-perpendicularly expanding partition member is disposed by being supported by the outer cylinder between axial facing surfaces of the rubber elastic body and the flexible film, so that a primary fluid chamber partially formed by the rubber elastic body and an auxiliary fluid chamber partially formed by the flexible film are formed on either side of the partition member, sealing the non-compressible fluid in the primary and auxiliary fluid chambers and a communicating passage through which the primary and auxiliary fluid chambers communicate with each other is formed, and wherein both the diaphragm and the flexible film are bonded by vulcanization to the outer cylinder so that the window opening of the outer cylinder is fluid-tightly closed by the diaphragm, and the other opening of the outer cylinder is fluid-tightly closed by the flexible film.

8. A fluid-filled vibration damping device according to claim 6, wherein the inner shaft has the solid structure inserted through one axial opening of the outer cylinder toward an axial intermediate portion thereof so that the one axial opening of the outer cylinder is fluid-tightly closed by the rubber elastic body that elastically links the inner shaft and the outer cylinder, while an other axial opening of the outer cylinder is fluid-tightly closed by a flexible film, and an axis-perpendicularly expanding partition member is disposed by being supported by the outer cylinder between axial facing surfaces of the rubber elastic body and the flexible film, so that a primary fluid chamber partially formed by the rubber elastic body and an auxiliary fluid chamber partially formed by the flexible film are formed on either side of the partition member, sealing the non-compressible fluid in the primary and auxiliary fluid chambers, and a communicating passage through which the primary and auxiliary fluid chambers communicate with each other is formed, and wherein the diaphragm and the flexible film are integrally formed of a same rubber material, and a seal rubber layer covering the inner circumferential surface of the outer cylinder over generally an entire surface is integrally formed with the diaphragm and the flexible film, and is bonded by vulcanization to the outer cylinder.

9. A fluid-filled vibration damping device according to claim 6, further comprising: an attachment bracket having a cylindrical portion that is fitted and secured to the outer cylinder so that the diaphragm disposed at the window opening of the outer cylinder is covered from an outside by the cylindrical portion of the attachment bracket so as to form a sealed air chamber on a side opposite the equilibrium chamber with the diaphragm interposed therebetween.

* * * * *